United States Patent
Kimura et al.

(10) Patent No.: US 8,143,798 B2
(45) Date of Patent: Mar. 27, 2012

(54) DRIVING DEVICE AND DRIVING METHOD FOR DISCHARGE LAMP, LIGHT SOURCE DEVICE, AND IMAGE DISPLAY APPARATUS

(75) Inventors: Keishi Kimura, Matsumoto (JP); Kentaro Yamauchi, Ashiya (JP); Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 12/534,897

(22) Filed: Aug. 4, 2009

(65) Prior Publication Data

US 2010/0033103 A1 Feb. 11, 2010

(30) Foreign Application Priority Data

Aug. 7, 2008 (JP) ................................. 2008-204633
Jul. 9, 2009 (JP) ................................. 2009-162574

(51) Int. Cl.
*H05B 41/36* (2006.01)

(52) U.S. Cl. .......................... 315/246; 315/287; 315/291

(58) Field of Classification Search .................. 315/129, 315/209 R, 246, 287, 291, 307–309
See application file for complete search history.

(56) References Cited

U.S. PATENT DOCUMENTS

| | | | |
|---|---|---|---|
| 6,232,725 B1 | 5/2001 | Derra et al. | |
| 7,511,432 B2 | 3/2009 | Watanabe et al. | |
| 2008/0116820 A1* | 5/2008 | Ozasa et al. | 315/246 |
| 2008/0150445 A1* | 6/2008 | Ichikawa et al. | 315/219 |
| 2009/0289557 A1* | 11/2009 | Itoh et al. | 315/127 |

FOREIGN PATENT DOCUMENTS

| | | |
|---|---|---|
| JP | A-2007-250236 | 9/2007 |
| JP | A-2008-41588 | 2/2008 |
| JP | B2-4325620 | 9/2009 |

* cited by examiner

*Primary Examiner* — Don Le
(74) *Attorney, Agent, or Firm* — Oliff & Berridge, PLC

(57) ABSTRACT

A driving device for a discharge lamp includes: a discharge-lamp lighting unit that supplies an alternating current to the discharge lamp to thereby supply electric power to between two electrodes of the discharge lamp; an inter-electrode-voltage detecting unit that detects an inter-electrode voltage applied when predetermined electric power is supplied to between the two electrodes; and a power-supply-condition switching unit that switches, on the basis of the detected inter-electrode voltage, the power supply by the discharge-lamp lighting unit with a predetermined hysteresis given to the switching of the power supply conditions, wherein the power supply conditions are switched by changing at least one of a frequency of the alternating current, a duty ratio of the alternating current, a modulation pattern of the frequency, and a modulation pattern of the duty ratio.

19 Claims, 10 Drawing Sheets

| POWER SUPPLY CONDITION | LAMP VOLTAGE THRESHOLD (V) | | ANODE DUTY RATIO OF MAIN MIRROR SIDE ELECTRODE (%) | |
|---|---|---|---|---|
| | LOWER | UPPER | MINIMUM | MAXIMUM |
| #1 | − | 82 | 45 | 65 |
| #2 | 78 | 92 | 40 | 70 |
| #3 | 88 | 112 | 35 | 75 |
| #4 | 108 | − | 30 | 80 |

| POWER SUPPLY CONDITION | LAMP VOLTAGE THRESHOLD (V) | | ANODE DUTY RATIO OF MAIN MIRROR SIDE ELECTRODE (%) | |
|---|---|---|---|---|
| | LOWER | UPPER | MINIMUM | MAXIMUM |
| #1 | - | 82 | 45 | 65 |
| #2 | 78 | 94 | 40 | 70 |
| #3 | 86 | 116 | 35 | 75 |
| #4 | 104 | - | 30 | 80 |

| POWER SUPPLY CONDITION | LAMP VOLTAGE THRESHOLD (V) | | DRIVING FREQUENCY fd (Hz) |
|---|---|---|---|
| | LOWER | UPPER | |
| #1 | - | 82 | 80 |
| #2 | 78 | 92 | 130 |
| #3 | 88 | 112 | 170 |
| #4 | 108 | - | 400 |

DRIVING DEVICE AND DRIVING METHOD FOR DISCHARGE LAMP, LIGHT SOURCE DEVICE, AND IMAGE DISPLAY APPARATUS

BACKGROUND

1. Technical Field

The present invention relates to a driving technique for a discharge lamp that is lit according to electric discharge between electrodes.

2. Related Art

A high-intensity discharge lamp such as a high-pressure discharge lamp is used as a light source used for an image display apparatus such as a projector. In such a high-intensity discharge lamp, deterioration of the electrodes worsens according to energization. When the electrodes are deteriorated, it is likely that arc jump, flicker and the like which a light arc generation position moves occur. Usually, when the electrodes are deteriorated, a voltage between the electrodes (a lamp voltage) rises. Therefore, the lamp voltage is detected, a driving condition (a power supply condition) for the high-intensity discharge lamp is changed on the basis of the detected lamp voltage to repair the deteriorated electrodes (see, for example, U.S. Pat. No. 6,232,725).

However, although a power supply condition for use in a state of a higher lamp voltage (a high-voltage side power supply condition) is suitable for repairing the electrodes, if the high-intensity discharge lamp continues to be driven under this condition for a long time, it is likely that a harmful effect such as blackening is caused. Under a power supply condition for use in a state of a lower lamp voltage (a low-voltage side power supply condition), although the harmful effect such as blackening does no occur, the deterioration of the electrodes gradually worsens. This problem is not limited to the high-intensity discharge lamp and is common to various discharge lamps that radiate light according to ark discharge between electrodes.

SUMMARY

An advantage of some aspects of the present invention is to provide a technique for suppressing deterioration of a discharge lamp without causing a harmful effect such as blackening.

An advantage of some aspects of the invention is intended to address the problem at least in part, and can be reduced to practice as described below.

A drive device according to an aspect of the invention is a driving device for a discharge lamp including:

a discharge-lamp lighting unit that supplies an alternating current to the discharge lamp to thereby supply electric power to between two electrodes of the discharge lamp and light the discharge lamp;

an inter-electrode-voltage detecting unit that detects an inter-electrode voltage applied when predetermined electric power is supplied to between the two electrodes; and a power-supply-condition switching unit that switches, on the basis of the detected inter-electrode voltage, the power supply by the discharge-lamp lighting unit between a first power supply condition and a second power supply condition different from the first power supply condition with a predetermined hysteresis given to the switching of the power supply conditions, wherein the power supply conditions are switched by changing at least one of a frequency of the alternating current, a duty ratio of the alternating current, a modulation pattern of the frequency, and a modulation pattern of the duty ratio.

With this configuration, the power supply conditions are switched on the basis of the inter-electrode voltage applied when the predetermined electric power is supplied to between the two electrodes. The inter-electrode voltage applied when the predetermined electric power is supplied to between the two electrodes is one parameter representing a deterioration state of the discharge lamp. Therefore, it is possible to appropriately suppress the deterioration of the discharge lamp by switching, on the basis of the inter-electrode voltage detected by the inter-electrode-voltage detecting unit, the power supply by the discharge-lamp lighting unit to a power supply condition for suppressing the deterioration of the discharge lamp. It is possible to prevent the power supply conditions from being frequently switched and perform stable power supply control by giving a hysteresis to the switching.

The frequency and the duty ratio of the alternating current are parameters that can be easily set in a general inverter circuit. Therefore, the change of the frequency, the duty ratio and the modulation patterns thereof can be realized by using the general inverter circuit. This makes it easier to configure the driving device for the discharge lamp.

Further, according to a specific aspect of the invention, the power-supply-condition switching unit changes the width of the hysteresis according to a predetermined parameter based on electric behavior of the discharge lamp.

The electric behavior of the discharge lamp changes according to a state of the electrodes of the discharge lamp. Therefore, for example, assuming that the second power supply condition is a power supply condition more suitable for recovering a shape of the electrodes than the first power supply condition, when the parameter based on the electric behavior of the discharge lamp indicates deterioration of the electrodes of the discharge lamp, it is possible to sufficiently recover the shape of the electrodes with the second power supply condition if the hysteresis width is set large. Therefore, it is possible to suitably suppress the deterioration of the discharge lamp.

Further, according to a specific aspect of the invention, the parameter based on the electric behavior of the discharge lamp is fluctuation width of the inter-electrode voltage detected by the inter-electrode-voltage detecting unit.

The fluctuation width of the inter-electrode voltage of the discharge lamp changes according to a state of the electrodes of the discharge lamp. In other words, the fluctuation width of the inter-electrode voltage of the discharge lamp is one parameter representing the state (deterioration) of the electrodes of the discharge lamp. Therefore, for example, assuming that the second power supply condition is a power supply condition more suitable for recovering a shape of the electrodes than the first power supply condition, when the fluctuation width of the inter-electrode voltage indicates deterioration of the electrodes of the discharge lamp, it is possible to sufficiently recover the shape of the electrodes with the second power supply condition if the hysteresis width is set large. Therefore, it is possible to suitably suppress the deterioration of the discharge lamp.

Further, according to a specific aspect of the invention, the power-supply-condition switching unit sets the hysteresis width larger as the fluctuation width of the inter-electrode voltage is larger.

In the discharge lamp, when a tip shape of the electrodes is roughened (i.e., deteriorated), in some cases, the fluctuation width of the inter-electrode voltage increases. For examples assuming that the second power supply condition is a power supply condition more suitable for recovering a shape of the electrodes than the first power supply condition, it is possible to sufficiently recover the shape of the electrodes with the second power supply condition if the hysteresis width is set larger as the fluctuation width of the inter-electrode voltage is larger. Therefore, it is possible to suitably suppress the deterioration of the discharge lamp.

Further, according to a specific aspect of the invention, the parameter based on the electric behavior of the discharge lamp is electric power supplied to between the two electrodes of the discharge lamp by the discharge-lamp lighting unit.

In the discharge lamp, a degree of a change in an electrode shape is different depending on the electric power supplied to between the two electrodes. Therefore, for example, assuming that the second power supply condition is a power supply condition more suitable for recovering a shape of the electrodes than the first power supply condition, when the electric power supplied to between the two electrodes has a power level at which the electrodes of the discharge lamp tend to be deteriorated, it is possible to sufficiently recover the shape of the electrodes with the second power supply condition if the hysteresis width is set large. Therefore, it is possible to suitably suppress the deterioration of the discharge lamp.

Further, according to a specific aspect of the invention, the power-supply-condition switching unit sets the hysteresis width larger as the electric power supplied to between the two electrodes of the discharge lamp is smaller.

In the discharge lamp, in some cases, an electrode shape is roughened more as the electric power supplied to between the two electrodes is smaller. For example, assuming that the second power supply condition is a power supply condition more suitable for recovering a shape of the electrodes than the first power supply condition, it is possible to sufficiently recover the shape of the electrodes with the second power supply condition if the hysteresis width is set larger as the electric power supplied to between the two electrodes of the discharge lamp is smaller. Therefore, it is possible to suitably suppress the deterioration of the discharge lamp.

Further, according to a specific aspect of the invention, the power-supply-condition switching unit switches, on the basis of the detected inter-electrode voltage, the power supply by the discharge-lamp lighting unit between the second power supply condition and a third power supply condition different from the first power supply condition with the predetermined hysteresis given to the switching of the power supply.

With this configuration, since the power supply conditions can be switched more in detail, it is possible to more appropriately suppress deterioration of the discharge lamp.

Further, according to a specific aspect of the invention,
the power supply conditions are the first power supply condition, the second power supply condition, and the third power supply condition in order of smallness of the detected inter-electrode voltage, and
hysteresis width of switching between the second power supply condition and the third power supply condition is larger than hysteresis width of switching between the first power supply condition and the second power supply condition.

By setting the hysteresis width large in a state of a high inter-electrode voltage in which deterioration of the discharge lamp tends to worsen, in a state in which switching from the third power supply condition to the second power supply condition could occur, switching to the second power supply condition is more suppressed and driving time under the third power supply condition is long. In this configuration, since the driving time under the third power supply condition in the state in which switching to the second power supply condition could occur can be set longer in this way, it is possible to surely repair the electrode having projections and the deterioration of the discharge lamp is suppressed.

Further, according to a specific aspect of the invention, the power-supply-condition switching unit switches a power supply condition for the electric power supplied to between the two electrodes from the first power supply condition to the second power supply condition when the inter-electrode voltage rises and reaches a first upper limit voltage under the first power supply condition and switches the power supply condition from the second power supply condition to the first power supply condition when the inter-electrode voltage falls and reaches a second lower limit voltage lower than the first upper limit voltage under the second power supply condition.

With this configuration, the switching from the second power supply condition to the first power supply condition is performed when the inter-electrode voltage reaches the second lower limit voltage lower than the first upper limit voltage. Therefore, when the inter-electrode voltage falls under the second power supply condition, the second power supply condition is switched to the first power supply condition after the inter-electrode voltage sufficiently falls. Therefore, the switching to the second power supply condition after the switching to the first power supply condition is suppressed. If a load on the discharge lamp is small under the first power supply condition compared with the second power supply condition, when the switching to the second power supply condition after the power supply condition is reset to the first power supply condition is suppressed in this way, driving time under the first power supply condition is long. Therefore, it is possible to suppress deterioration of the discharge lamp without causing a harmful effect such as blackening of the electrodes of the discharge lamp.

Further, according to a specific aspect of the invention, the power-supply-condition switching unit switches a power supply condition for the electric power supplied to between the two electrodes from the second power supply condition to the third power supply condition when the inter-electrode voltage rises and reaches a second upper limit voltage under the second power supply condition and switches the power supply condition from the third power supply condition to the second power supply condition when the inter-electrode voltage falls and reaches a third lower limit voltage lower than the second upper limit voltage under the third power supply condition.

With this configuration, when the inter-electrode voltage rises and reaches the second upper limit voltage under the second power supply condition, the power supply condition is switched to the third power supply condition. The switching from the third power supply condition to the second power supply condition is performed when the inter-electrode voltage reaches the third lower limit voltage lower than the second upper limit voltage. Therefore, when the inter-electrode voltage falls under the third power supply condition, the third power supply condition is switched to the second power supply condition after the inter-electrode voltage sufficiently falls. The switching to the third power supply condition after the switching to the second power supply condition is suppressed. Since the switching to the third power supply condition after the power supply condition is reset to the second power supply condition is suppressed in this way, driving time under the second power supply condition is long. It is possible to suppress deterioration of the discharge lamp without causing a harmful effect such as blackening of the electrodes of the discharge lamp.

The present invention can be realized in various forms. The present invention can be realized in forms such as a driving device and a driving method for a discharge lamp, a light source device including the discharge lamp and a control method therefor, and an image display apparatus including the light source device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the present invention are explained below in the following order.
A. First Embodiment (a duty ratio modulation range is switched)
B. Second Embodiment (hysteresis width is changed according to a lamp voltage)
C. Third Embodiment (a driving frequency is switched)
D. Modifications A. First Embodiment (A Duty Ratio Modulation Range is Switched)

Figure 1:
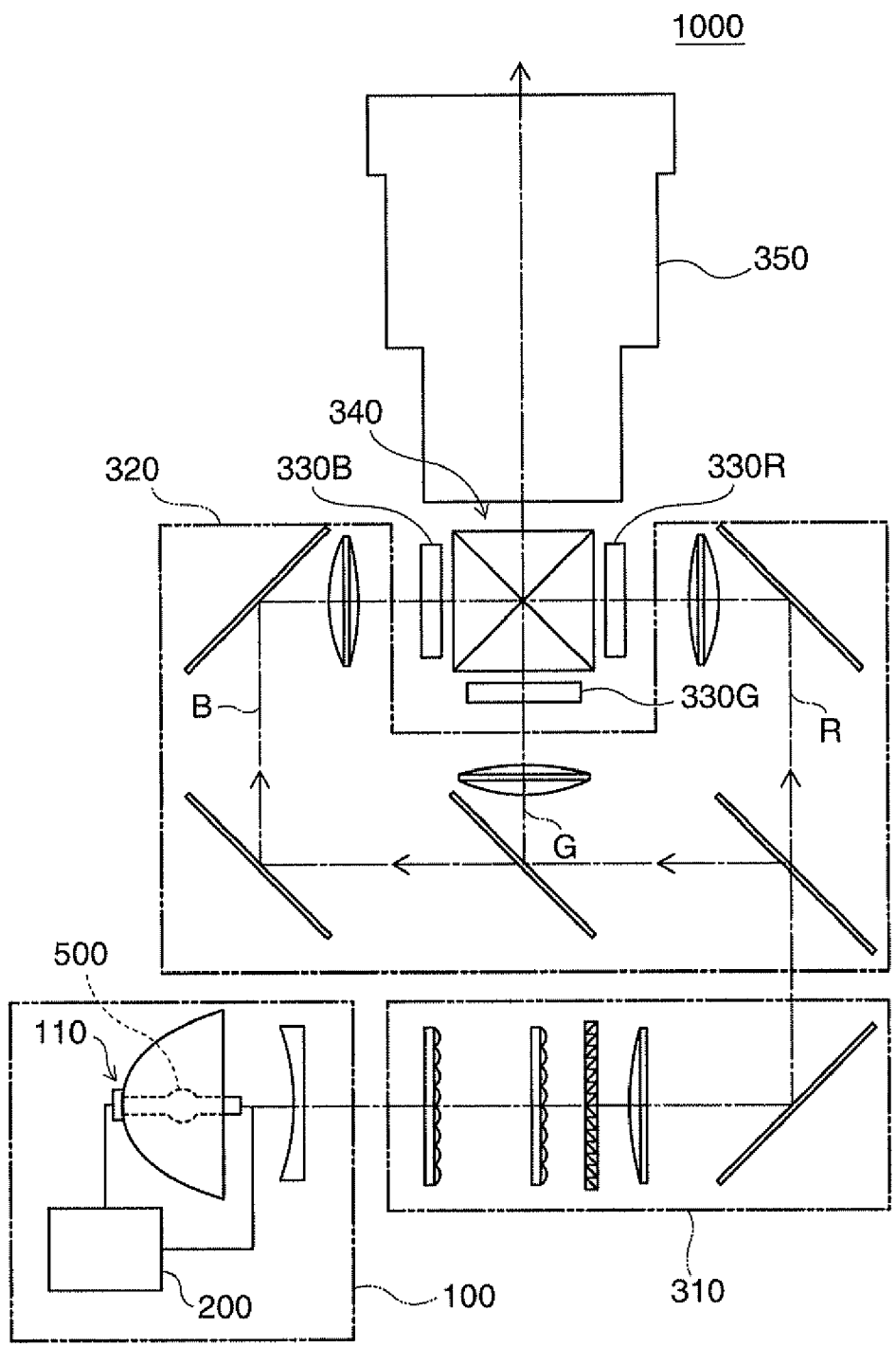
FIG. 1 is a schematic diagram of a projector according to a first embodiment of the present invention.

FIG. 1 is a schematic diagram of a projector 1000 according to a first embodiment of the present invention. The projector 1000 includes a light source device 100, an illumination optical system 310, a color separation optical system 320, three liquid crystal light valves 330R, 330G, and 330B, a cross dichroic prism 340, and a projection optical system 350.

The light source device 100 includes a light source unit 110 to which a discharge lamp 500 is attached and a discharge lamp driving device 200 that drives the discharge lamp 500. The discharge lamp 500 receives the supply of electric power from the discharge lamp driving device 200, discharges, and radiates light. The light source unit 110 emits the radiated light of the discharge lamp 500 to the illumination optical system 310. Specific configurations and functions of the light source unit 110 and the discharge lamp driving device 200 are explained later.

The illuminance of the light emitted from the light source unit 110 is uniformalized and deflecting directions thereof are aligned in one direction by the illumination optical system 310. The light with the illuminance uniformalized and the deflecting directions aligned through the illumination optical system 310 is separated into color lights of three colors, red (R), green (G), and blue (B) by the color separation optical system 320. The color lights of the three colors separated by the color separation optical system 320 are respectively modulated by the liquid crystal light valves 330R, 330G, and 330B corresponding thereto. The color lights of the three colors modulated by the liquid crystal light valves 330R, 330G, and 330B are combined by the cross dichroic prism 340 and made incident on the projection optical system 350. The projection optical system 350 projects the incident light on a not-shown screen, whereby an image modulated by the liquid crystal light valves 330R, 330G, and 330B is displayed on a screen as a combined full-color video. In the first embodiment, the color lights of the three colors are separately modulated by the three liquid crystal light valves 330R, 330G, and 330B. However, the modulation of light may be performed by one liquid crystal light valve including a color filter. In this case, the color separation optical system 320 and the cross dichroic prism 340 can be omitted.

Figure 2:
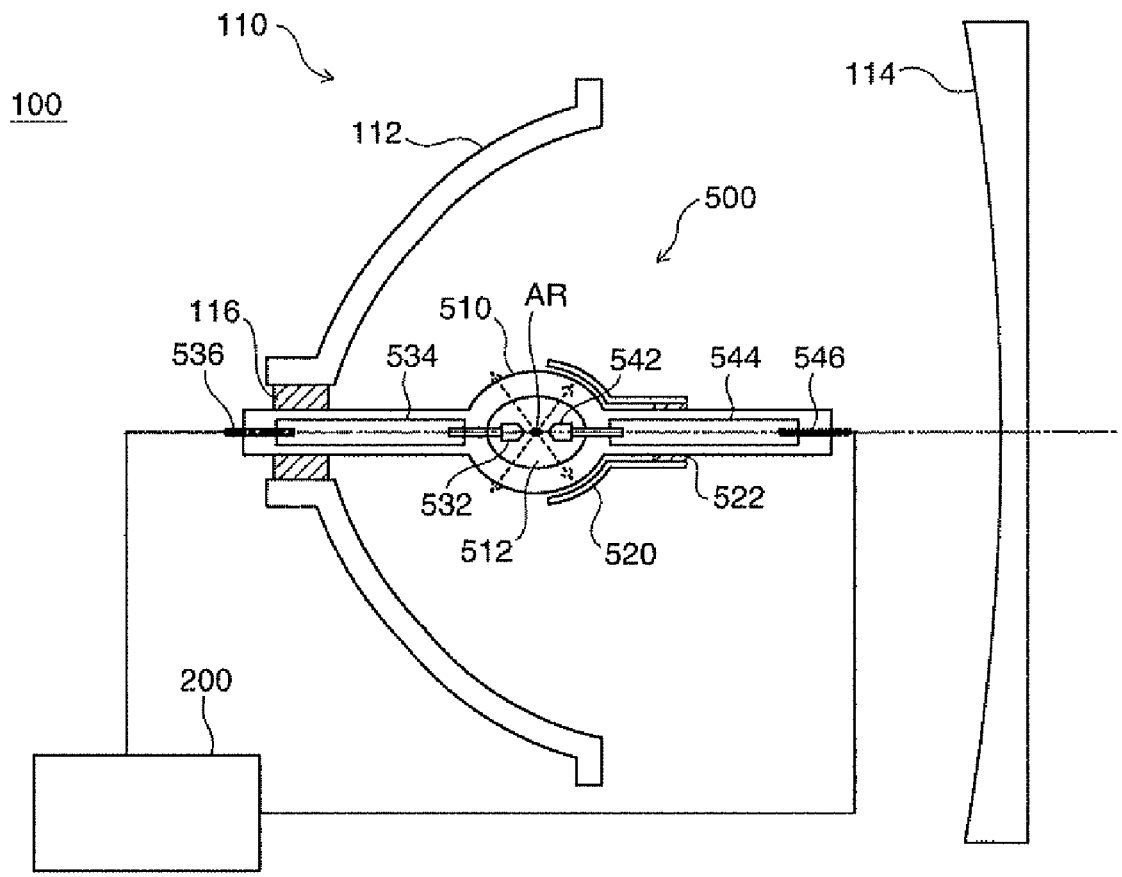
FIG. 2 is a diagram for explaining a configuration of a light source device.

FIG. 2 is a diagram for explaining a configuration of the light source device 100. As explained above, the light source device 100 includes the light source unit 110 and the discharge lamp driving device 200. The light source unit 110 includes the discharge lamp 500, a main reflecting mirror 112 having a reflection surface of a spheroidal shape, and a parallelizing lens 114 that changes emitted light to substantially parallel light. However, the reflection surface of the main reflecting mirror 112 does not always have to be formed in the spheroid shape. For example, the reflection surface of the main reflecting mirror 112 may be formed in a paraboloidal shape. In this case, if a light emitting section of the discharge lamp 500 is placed in a so-called focus of a parabolic surface mirror, the parallelizing lens 114 can be omitted. The main reflecting mirror 112 and the discharge lamp 500 are bonded by an inorganic adhesive 116.

The discharge lamp 500 is formed by bonding a discharge lamp main body 510 and a sub-reflecting mirror 520, which has a spherical reflection surface, with an inorganic adhesive 522. The discharge lamp main body 510 is formed of a glass material such as a quartz glass. The discharge lamp main body 510 includes two electrodes 532 and 542 formed of an electrode material of high-melting point metal such as tungsten, two connection members 534 and 544, and two electrode terminals 536 and 546. The electrodes 532 and 542 are arranged such that tips thereof are opposed to each other in a discharge space 512 formed in the center of the discharge lamp main body 510. A rare gas or gas containing, mercury, a metal halogen compound, and the like is encapsulated in the discharge space 512 as a discharge medium, The connection members 534 and 544 are members that electrically connects the electrodes 532 and 542 and the electrode terminals 536 and 546, respectively.

The electrode terminals 536 and 546 of the discharge lamp 500 are connected to output terminals of the discharge lamp driving device 200, respectively. The discharge lamp driving device 200 supplies a pulse-like alternating current (an alternating pulse current) to the electrode terminals 536 and 546. When the alternating pulse current is supplied to the electrode terminals 536 and 546, an arc AR is generated between the tips of the two electrodes 532 and 542 in the discharge space 512. The arc AR radiates light from a generation position of the arc AR in all directions. The sub-reflecting mirror 520 reflects the light radiated in the direction of one electrode 542 to the main reflecting mirror 112. By reflecting the light radiated in the direction of the electrode 542 to the main reflecting mirror 112 in this way, it is possible to further increase parallelism of the light emitted from the light source unit 110. In the following explanation, the electrode 542 on a side on which the sub-reflecting mirror 520 is provided is also referred to as "sub-mirror side electrode 542" and the other electrode 532 is also referred to as "main mirror side electrode 532".

Figure 3:
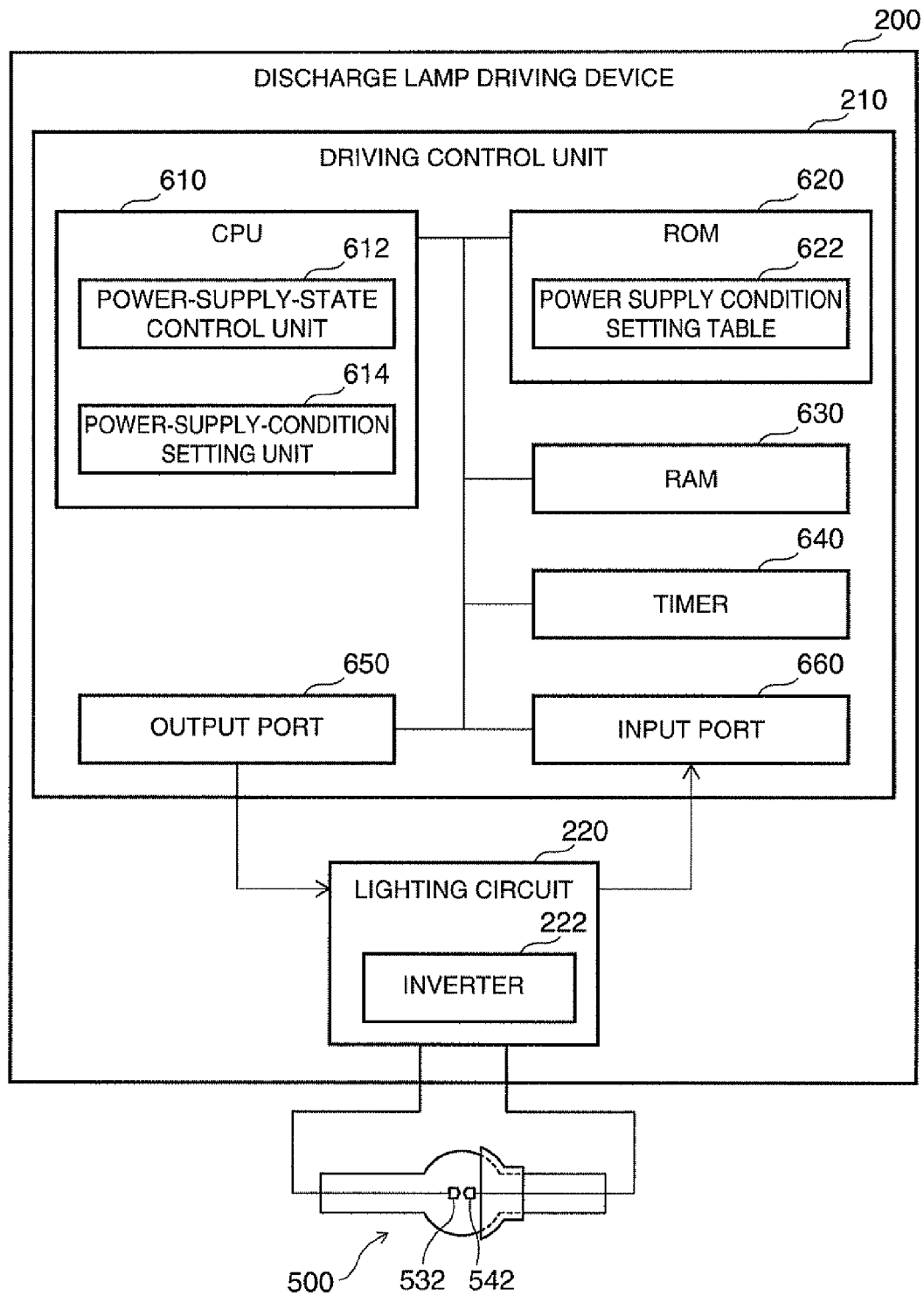
FIG. 3 is a block diagram of a configuration of a discharge lamp driving device.

FIG. 3 is a block diagram of a configuration of the discharge lamp driving device 200. The discharge lamp driving device 200 includes a driving control unit 210 and a lighting circuit 220. The driving control unit 210 is configured as a computer including a CPU 610, a ROM 620, a RAM 630, a timer 640, an output port 650 for outputting a control signal to the lighting circuit 220, and an input port 660 for acquiring a signal from the lighting circuit 220. In the ROM 620, a computer program (not shown in the figure) executed by the CPU 610 and a power-supply-condition setting table 622 are stored. The CPU 610 of the driving control unit 210 executes the computer program stored in the ROM 620 referring to the power-supply-condition setting table 622 and on the basis of output of the timer 640. Consequently, the CPU 610 realizes functions of a power-supply-state control unit 612 and a power-supply-condition setting unit 614. Contents of the power-supply-condition setting table 622 and the functions of the power-supply-state control unit 612 and the power-supply-condition setting unit 614 are explained later.

The lighting circuit 220 includes an inverter 222 that generates an alternating pulse current. The lighting circuit 220 controls the inverter 222 on the basis of a control signal supplied from the driving control unit 210 via the output port 650 to thereby supply an alternating pulse current of constant power (e.g., 200 W) to the discharge lamp 500. Specifically, the lighting circuit 220 controls the inverter 222 to generate an alternating pulse current corresponding to power supply conditions (e.g., a frequency, a duty ratio, and a current waveform of an alternating pulse current) designated by the control signal. The lighting circuit 220 supplies the alternating pulse current generated by the inverter 222 to the discharge lamp 500.

The lighting circuit 220 detects a voltage between the electrodes 532 and 542 of the discharge lamp 500 and outputs the voltage as a lamp voltage. In this embodiment, the voltage between the electrodes 532 and 542 is directly detected. However, another parameter may be detected and treated as an inter-electrode voltage as long as the parameter reflects the voltage between the electrodes. For example, a voltage may be calculated from power consumption and a current value of the discharge lamp 500. A voltage can be estimated from a current value and the brightness of the discharge lamp 500.

Figure 4:
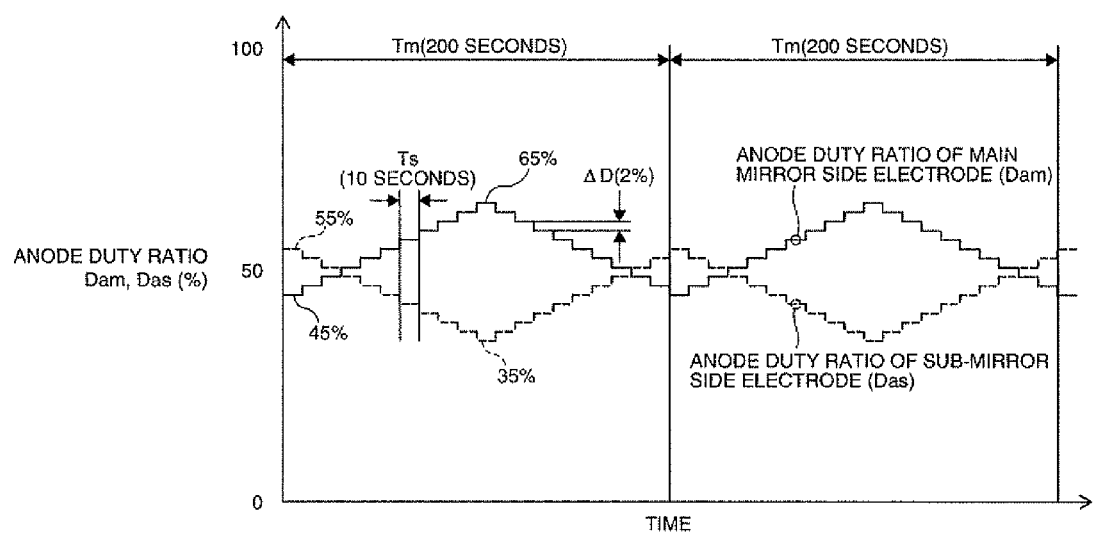
FIG. 4 is a diagram for explaining a state in which duty ratios of an alternating pulse current are modulated.

In the first embodiment, the power-supply-state control unit 612 of the driving control unit 210 modulates a duty ratio of an alternating pulse current within a modulation period (e.g., 200 seconds) set in advance. FIG. 4 is a diagram for explaining a state in which the duty ratio of the alternating pulse current is modulated. A graph shown in FIG. 4 indicates temporal changes of anode duty ratios Dam and Das. The anode duty ratios Dam and Das are ratios of times in which the two electrodes 532 and 542 operate as anodes (anode times) to one period of the alternating pulse current. In the graph shown in FIG. 4, a solid line indicates the anode duty ratio Dam of the main mirror side electrode 532 and a broken line indicates the anode duty ratio Das of the sub-mirror side electrode 542.

In an example shown in FIG. 4, the power-supply-state control unit 612 (FIG. 3) changes the anode duty ratios Dam and Das at predetermined change width ΔD (2%) every time step time Ts (10 seconds), which is 1/20 of a modulation period Tm (200 seconds), elapses. By modulating the anode duty ratios Dam and Das within the modulation period Tm in this way, it is possible to suppress abnormal discharge due to one-sided wear of electrodes or growth of needle-like crystals of an electrode material on electrode surfaces. In the first embodiment, the modulation period Tm is set to 200 seconds and the step time Ts is set to 10 seconds. However, the modulation period Tm and the step time Ts can be changed as appropriate on the basis of characteristics of the discharge lamp 500, power supply conditions, and the like.

As it is evident from FIG. 4, in the first embodiment, a maximum of the anode duty ratio Dam of the main mirror side electrode 532 is set higher than a maximum of the anode duty ratio Das of the sub-mirror side electrode 542. However, the maximums of the anode duty ratios of the two electrodes 532 and 542 do not always have to be different. When the maximums of the anode duty ratios are set high, as explained later, maximum temperature of the electrodes 532 and 542 increases. On the other hand, when the discharge lamp 500 including the sub-reflection mirror 520 as shown in FIG. 2 is used, heat from the sub-mirror side electrode 542 is less easily discharged. Therefore, it is desirable to set the maximum of the anode duty ratio Das of the sub-mirror side electrode 542 lower than the maximum of the anode duty ratio Dam of the main mirror side electrode 532 because an excessive temperature rise of the sub-mirror side electrode 542 can be suppressed. In general, when the two electrodes 532 and 542 are driven under the same operation conditions, if the temperature of one electrode is higher than the temperature of the other electrode because of the influence of a cooling method or the like, it is desirable to set an anode duty ratio of one electrode lower than an anode duty ratio of the other electrode.

In the first embodiment, the anode duty ratio Dam of the main mirror side electrode 532 is increased at every step time Ts in the former half of the modulation period Tm and is reduced at every step time Ts in the latter half. However, a changing pattern for the anode duty ratios Dam and Das is not limited to this. For example, the anode duty ratio Dam of the main mirror side electrode 532 may be monotonously increased or may be monotonously reduced within the modulation period Tm.

Figure 5A:
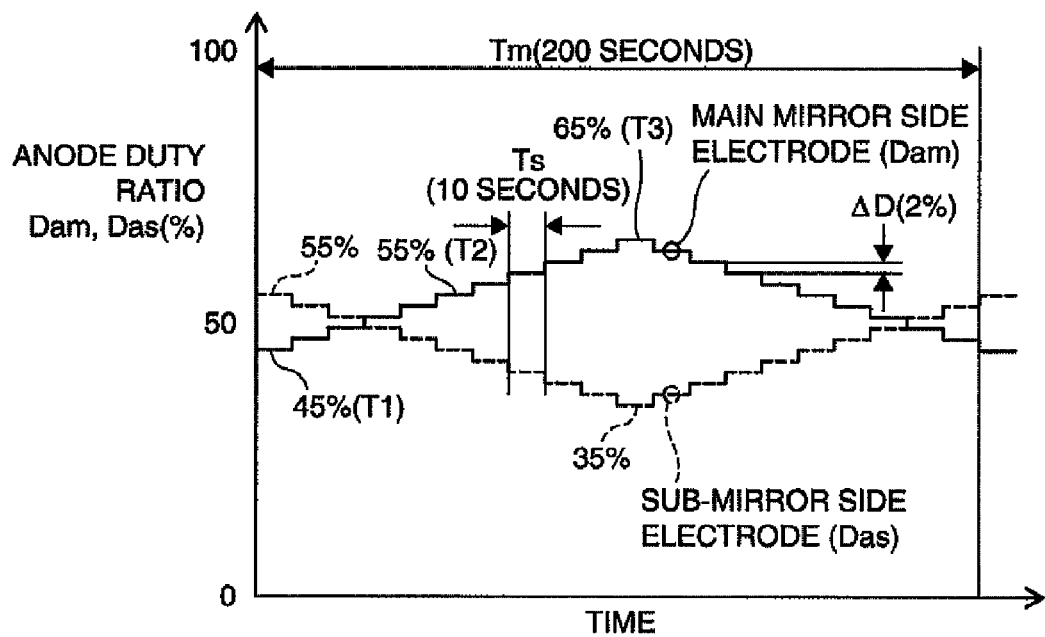
FIGS. 5A and 5B are diagrams for explaining a state in which anode duty ratios are modulated to drive a discharge lamp.
Figure 5B:
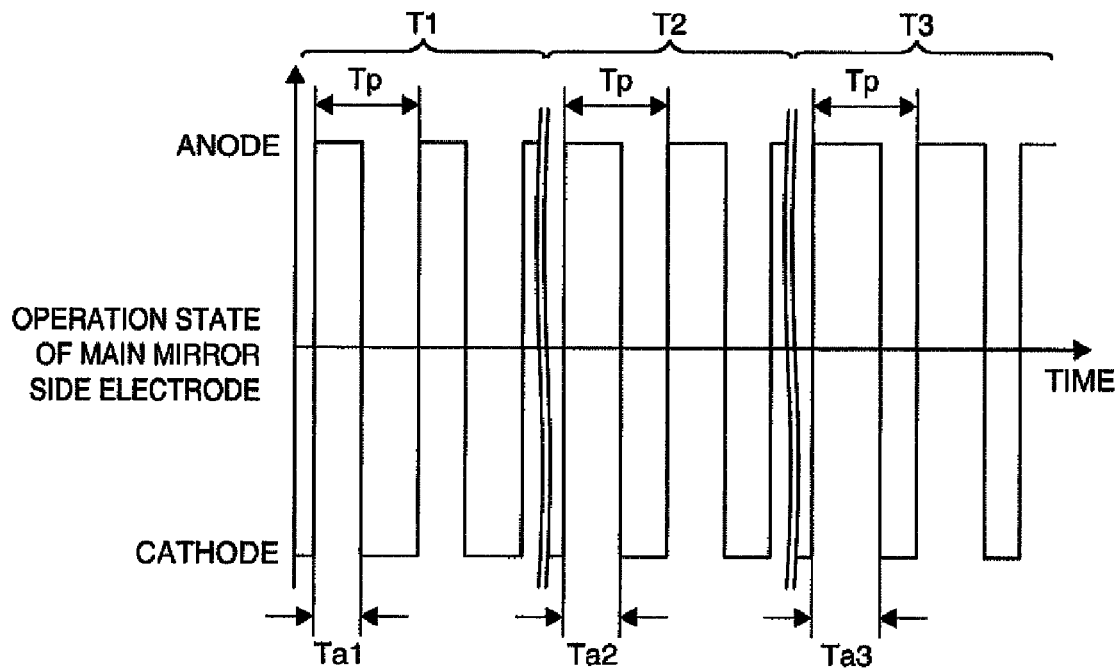

FIGS. 5A and 5B are diagrams for explaining a state in which the anode duty ratios are modulated to drive the discharge lamp 500. FIG. 5A is different from FIG. 4 in that temporal changes of the anode duty ratios Dam and Das are shown only for one modulation period (1 Tm). Otherwise, FIG. 5A is substantially the same as FIG. 4. Therefore, explanation of FIG. 5A is omitted. FIG. 5B is a graph of temporal changes of operation states of the main mirror side electrode 532 in three periods T1 to T3 in which the anode duty ratio Dam of the main mirror side electrode 532 is set to different values (45%, 55%, and 65%) in FIG. 5A.

As shown in FIG. 5B, in all of the three periods T1 to T3 in which the anode duty ratio Dam is different, a switching period Tp in which the polarity of the main mirror side electrode 532 is switched is fixed. In this way, in the first embodiment, a frequency (fd=1/Tp) of an alternating pulse current is set to a fixed frequency (e.g., 80 Hz) over the entire modulation period Tm. On the other hand, anode times Ta1 to Ta3 of the main mirror side electrode 532 are set to different values in the period T1 to T3 in which the anode duty ratio Dam is different. In this way, in the first embodiment, the modulation of the anode duty ratio Dam is performed by changing the anode time Ta while keeping the frequency fd (herein after also referred to as "driving frequency fd") of the alternating pulse current constant.

In the first embodiment, the power-supply-condition setting unit 614 (FIG. 3) of the driving control unit 210 sets power supply conditions for the discharge lamp 500 on the basis of the lamp voltage of the discharge lamp 500 and the power-supply-condition setting table 622 stored in the ROM 620. The lamp voltage is a voltage between the electrodes 532 and 542 applied when the discharge lamp 500 is driven with constant electric power and is one parameter representing a deterioration state of the discharge lamp 500. Specifically, the power-supply-condition setting unit 614 sets a range of an anode duty ratio set within the modulation period Tm (a modulation range) on the basis of the lamp voltage acquired via the input port 660 and referring to the power-supply-condition setting table 622. A method of setting a power supply condition (the modulation range of the anode duty ratio) by the power-supply-condition setting unit 614 is explained later.

The power-supply-state control unit 612 controls the lighting circuit 220 on the basis of the modulation range set by the power-supply-condition setting unit 614 such that an anode duty ratio is changed at every step time Ts. The modulation range is changed by changing the modulation width ΔD of the anode duty ratios Dam and Das at every step time Ts.

Figures 6, 7:
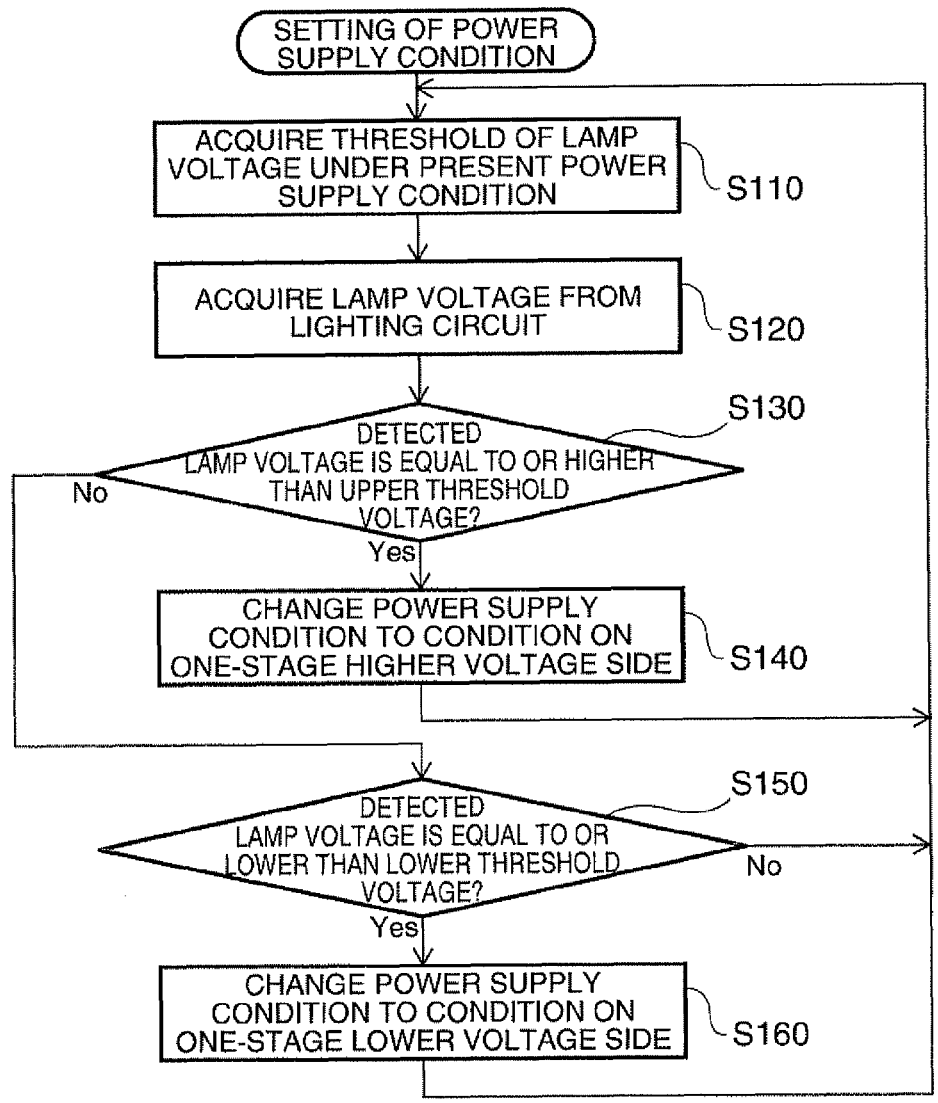
FIG. 6 is a flowchart of processing for setting power supply conditions according to the first embodiment.
FIG. 7 is a table of contents of a power-supply-condition setting table referred to by a power-supply-condition setting unit in performing processing for setting power supply conditions.

FIG. 6 is a flowchart of processing for setting power supply conditions according to the first embodiment. The processing for setting power supply conditions is always executed while the discharge lamp driving device 200 steadily drives the discharge lamp 500.

FIG. 7 is a table of contents of the power-supply-condition setting table 622 referred to by the power-supply-condition setting unit 614 in performing the processing for setting power supply conditions. In the power-supply-condition setting table 622, lower and upper thresholds of a lamp voltage as a reference for switching of a power supply condition and power supply conditions to be set, i.e., a minimum and a maximum of the anode duty ratio Dam of the main mirror side electrode 532 are stored in association with each of the power supply conditions. In the power-supply-condition setting table 622 shown in FIG. 7, four power supply conditions (#1 to #4) are specified according to the lamp voltage. However, the number of power supply conditions can be set to an arbitrary number as long as the number is equal to or larger than 2. In the following explanation, a power supply condition corresponding to a lower lamp voltage is also referred to as "low voltage side power supply condition" and a power supply condition corresponding to a higher lamp voltage is also referred to as "high voltage side power supply condition". For example, the first power supply condition (#1) is referred to as low voltage side power supply condition and the second power supply condition (#2) is also referred to as high-voltage side power supply condition.

In an example shown in FIG. 7, a modulation range of an anode duty ratio is specified by the maximum and the minimum of the anode duty ratio Dam in the power supply-condition setting table 622. However, the modulation range of the anode duty ratio can be specified by other parameters. For example, concerning the anode duty ratios Dam and Das of the main mirror side electrode 532 and the sub-mirror side electrode 542, the modulation range of the anode duty ratio can also be specified by a maximum or a minimum thereof. The modulation range can also be specified by the change width ΔD of the anode duty ratios Dam and Das at every step time Ts.

In step S110, the power-supply-condition setting unit 614 acquires a threshold of a lamp voltage corresponding to a currently-set power supply condition. Specifically, the power-supply-condition setting unit 614 acquires a lower threshold (a lower threshold voltage) and an upper threshold (an upper threshold voltage) of the lamp voltage corresponding to the currently-set power supply condition referring to the power-supply-condition setting table 622 (FIG. 7).

In step S120, the power-supply-condition setting unit 614 acquires a lamp voltage (a detected lamp voltage) from the lighting circuit 220 connected thereto via the input port 660.

In step S130, the power-supply-condition setting unit 614 determines whether the detected lamp voltage acquired in step S120 is equal to or larger than the upper threshold voltage. When the detected lamp voltage is equal to or larger than the upper threshold voltage, the processing proceeds to step S140. When the detected lamp voltage is lower than the upper threshold voltage, the processing proceeds to step S150.

In step S140, the power-supply-condition setting unit 614 changes the power supply condition to a power supply condition on a one-stage higher voltage side. As shown in FIG. 7, as the power supply condition in the first embodiment, the maximum of the anode duty ratio increases as the lamp voltage rises. Therefore, in step S140, the maximum value of the anode duty ratio is set to a value higher than that before change. After the change of the power supply condition in step S140, the processing returns to step S110.

In step S150, the power-supply-condition setting unit 614 determines whether the detected lamp voltage acquired in step S120 is equal to or smaller than the lower threshold voltage. When the detected lamp voltage is equal to or smaller than the lower threshold voltage, the processing proceeds to step S160. When the detected lamp voltage is higher than the lower threshold voltage, the processing returns to step S110.

In step S160, the power-supply-condition setting unit 614 changes the power supply condition to a power supply condition on a one-stage lower voltage side in the lamp voltage. As explained above, as the power supply condition in the first embodiment, the maximum of the anode duty ratio increases as the lamp voltage rises. Therefore, in step S160, the maximum value of the anode duty ratio is set to a value lower than that before change. After the change of the power supply condition in step S160, the processing returns to step S110.

In this way, the power-supply-condition setting unit 614 repeatedly executes step S110 and subsequent steps in FIG. 6 to thereby continuously execute the processing for setting power supply conditions while the discharge lamp 500 is steadily driven. However, the processing for setting power supply conditions does not always have to be continuously executed. For example, the timer 640 (FIG. 3) may be configured to generate an interval signal every time lighting time of the discharge lamp 500 exceeds predetermined time (e.g., ten hours). The CPU 610 may execute the processing for setting power supply conditions when the interval signal is received. In this case, the processing ends without returning to step S110.

As it is evident from the flowchart shown in FIG. 6, the power-supply-condition setting unit 614 switches the power supply condition according to the detected lamp voltage. Therefore, the power-supply-condition setting unit 614 can also be referred to as "power-supply-condition switching unit" that switches the power supply condition. The upper threshold voltage and the lower threshold voltage are voltages at an upper limit and a lower limit at which the power supply condition is continuously used. Therefore, the upper threshold voltage and the lower threshold voltage can also be referred to as "upper limit voltage" and "lower limit voltage", respectively.

Figure 8:
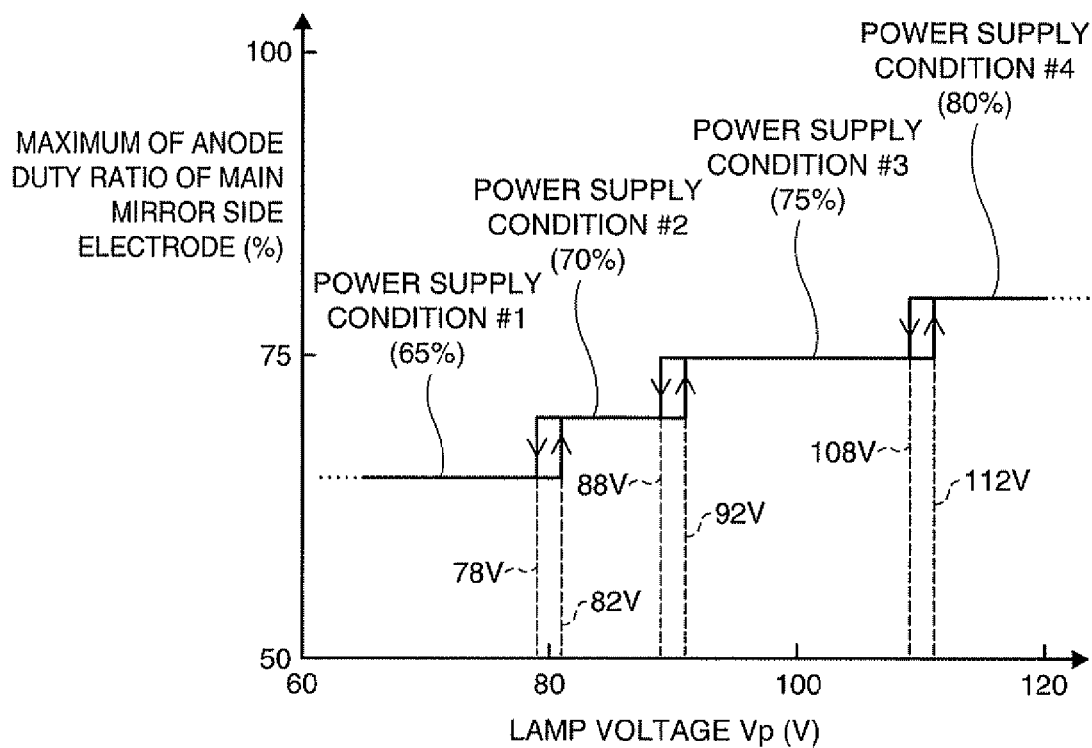
FIG. 8 is a diagram for explaining a state in which power supply conditions are set by the processing for setting power supply conditions shown in FIG. 6 according to a lamp voltage.

FIG. 8 is a diagram for explaining a state in which power supply conditions are set according to a lamp voltage by the processing for setting power supply conditions shown in FIG. 6. In a graph shown in FIG. 8, the abscissa represents the lamp voltage Vp and the ordinate represents a maximum of the anode duty ratio Dam of the main mirror side electrode 532.

When the driving of the discharge lamp 500 is performed under a first power supply condition (#1), the upper threshold voltage is set to 82 V. Therefore, when a currently-set power supply condition is the first power supply condition (#1), until the lamp voltage Vp reaches 82 V, the discharge lamp 500 is driven to set the maximum of the anode duty ratio Dam of the main mirror side electrode 532 to 65%. When the lamp voltage Vp reaches 82 V, a power supply condition to be used is switched to a second power supply condition (#2) and the maximum of the anode duty ratio Dam of the main mirror side electrode 532 is changed from 65% to 70%.

When the power supply condition is switched to the second power supply condition (#2), the upper threshold voltage is set to 92 V and the lower threshold voltage is set to 78 V. In the second power supply condition (#2), the maximum of the anode duty ratio Dam of the main mirror side electrode 532 is changed to 70%. In this way, the maximum of the anode duty ratio Dam of the main mirror side electrode 532 under the second power supply condition (#2) is set higher than the maximum (65%) of the anode duty ratio Dam under the first power supply condition. As shown in FIG. 7, the minimum of the anode duty ratio Dam of the main mirror side electrode 532 under the second power supply condition (#2) is set to 40% lower than the minimum (45%) of the anode duty ratio Dam under the first power supply condition (#1). Therefore, the maximum of the anode duty ratio Das of the sub-mirror side electrode 542 under the second power supply condition (#2) is set to 60% higher than the maximum (55%) of the anode duty ratio Das under the first power supply condition (#1).

Figures 9A, 9B:
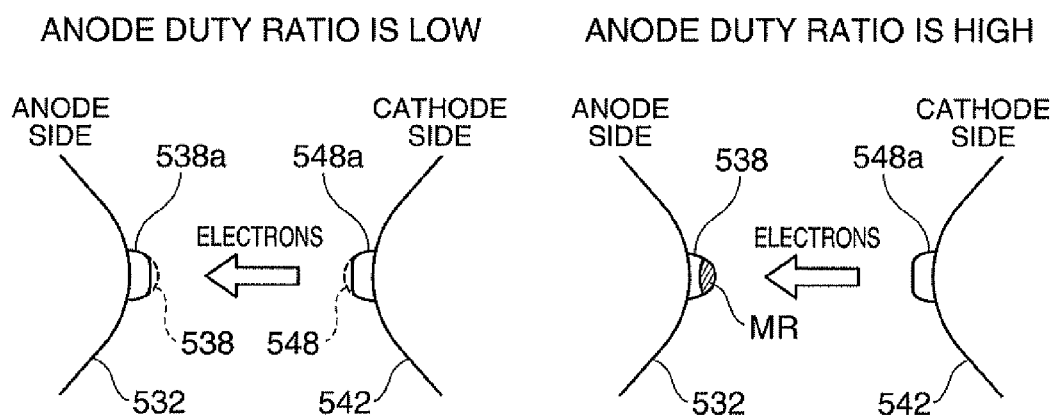
FIGS. 9A to 9D are diagrams for explaining the influence of a rise in an anode duty ratio on electrodes.
Figure 9C:
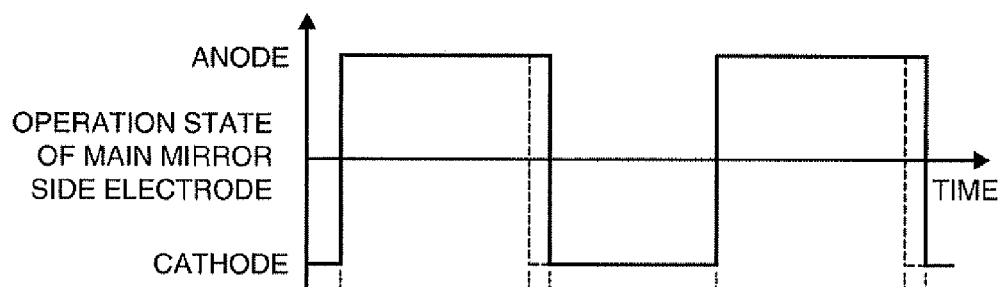
Figure 9D:
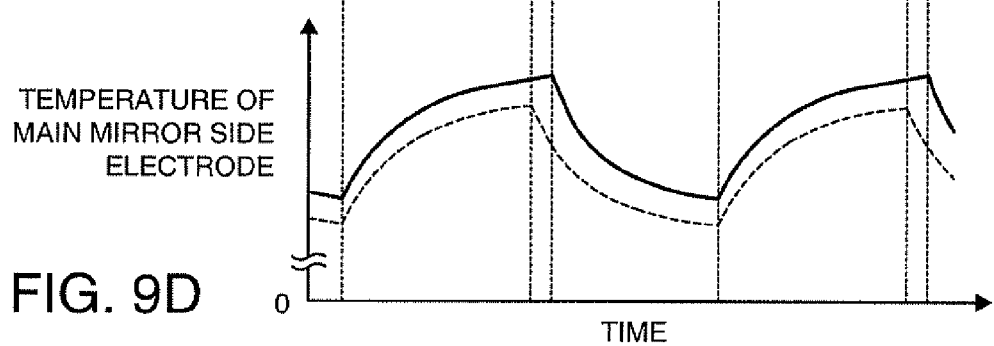

FIGS. 9A to 9D are diagrams for explaining the influence of a rise in an anode duty ratio on electrodes. FIGS. 9A and 9B are diagrams of a state of the main mirror side electrode 532 in a state in which the main mirror side electrode 532 operates as an anode. FIG. 9C is a graph representing a temporal change of an operation state of the main mirror side electrode 532. FIG. 9D is a graph representing a temporal change of the temperature of the main mirror side electrode 532.

In a state in which the deterioration of the discharge lamp 500 does not worsen, as indicated by a broken line in FIG. 9A, at the tips of the electrodes 532 and 542, dome-like projections 538 and 548 are formed to face the electrodes opposed thereto. The electrode material evaporates from the dome-like projections 538 and 548 according to the use of the discharge light 500. As indicated by a solid line, tips of the projections 538a and 548a are flattened. When the tips of the projections 538a and 548a are flattened in this way, it is more likely that a generation position of an arc becomes unstable and the position of the arc moves during lighting, i.e., so-called arc jump is more likely to occur. Since a distance between the electrodes 532 and 542 increases, the lamp voltage rises. In the first embodiment, by setting the anode duty ratio high, the dome-like projections 538 and 548 are re-formed from the projections 538a and 548a flattened in this way.

As shown in FIGS. 9A and 9B, when the main mirror side electrode 532 operates as an anode, electrons are emitted from the sub-mirror side electrode 542 and collide with the main mirror side electrode 532. According to the collision of the electrons, kinetic energy of the electrons is converted into thermal energy in the main mirror side electrode 532 on the anode side and the temperature of the main mirror side electrode 532 rises. On the other hand, in the sub-mirror side electrode 542 on a cathode side, since collision of electrons does not occur, the temperature of the sub-mirror side electrode 542 falls because of heat conduction, radiation, and the like. Similarly, in a period in which the main mirror side electrode 532 operates as a cathode, the temperature of the main mirror side electrode 532 falls and the temperature of the sub-mirror side electrode 542 rises.

Therefore, when the anode duty ratio of the main mirror side electrode 532 is set high as shown in FIG. 9C, as shown in FIG. 9D, time during which the temperature of the main mirror side electrode 532 rises is long and time during which the temperature of the main mirror side electrode 532 falls is short. In this way, when the anode duty ratio of the main mirror side electrode 532 is set high, maximum temperature of the main mirror side electrode 532 rises. When the maximum temperature of the main mirror side electrode 532 rises, as shown in FIG. 9B, a melted portion MR in which the electrode material is melted is formed at the tip of the projection 538. The melted portion MR in which the electrode material is melted is formed in a dome shape because of the surface tension.

In the first embodiment, the maximums of the anode duty ratios Dam and Das of the main mirror side electrode 532 and the sub-mirror side electrode 542 under the second power supply condition (#2) are set higher than those under the first power supply condition (#1). Therefore, the dome-like projections 538 and 548 are re-formed in the two electrodes 532 and 542. Consequently, the generation position of an arc becomes stable and the likelihood of occurrence of the arc jump is reduced. Since the dome-like projections 538 and 548 are re-formed, the distance between the electrodes 532 and 542 is reduced and the lamp voltage Vp falls.

In this way, when the driving of the discharge lamp 500 is performed under the second power supply condition (#2) and the lamp voltage Vp falls according to the formation of the dome-like projection, as shown in FIG. 8, the discharge lamp 500 is driven under the second power supply condition (#2) until the lamp voltage Vp falls to 78 V. Therefore, the dome-like projections 538 and 548 are sufficiently re-formed (repaired). In this way, since the projections 538 and 548 are sufficiently repaired, the rise in the lamp voltage Vp is suppressed and the driving time under the first power supply condition (#1) can be set longer.

On the other hand, when the lamp voltage Vp also rises under the second power supply condition (#2), as shown in FIG. 8, the power supply condition is switched from the second power supply condition (#2) to the third power supply condition (#3) when the lamp voltage Vp reaches 92 V. The lamp voltage Vp falls according to the driving under the third power supply condition (#3). When the lamp voltage Vp falls to 88 V, the power supply condition is switched from the third power supply condition (#3) to the second power supply condition (#2).

Similarly, when the lamp voltage Vp rises, the power supply condition is switched from the third power supply condition (#3) to the fourth power supply condition (#4) when the lamp voltage Vp reaches 112 V. When the lamp voltage Vp falls to 108V, the power supply condition is switched from the fourth power supply condition (#4) to the third power supply condition (#3).

In the first embodiment, as shown in FIG. 7, between the two poser supply conditions, the lamp voltage at which the power supply condition is switched when the lamp voltage increases (the upper threshold voltage) is set higher than the lamp voltage at which the power supply condition is switched when the lamp voltage decreases (the lower threshold voltage). Therefore, the switching of the power supply condition with respect to the change in the lamp voltage is performed at different voltages when the lamp voltage rises and when the lamp voltage falls. As shown in FIG. 8, the power supply condition (the maximum of the anode duty ratio Dam of the main mirror side electrode 532) set by the power supply-condition setting unit 614 has a hysteresis characteristic with respect to the lamp voltage Vp.

Since the power supply condition has the hysteresis characteristic with respect to the lamp voltage Vp in this way, even if the projections 538 and 548 at the tips of the electrodes are repaired and the lamp voltage Vp falls, the discharge lamp 500 is driven under the power supply conditions on the high voltage side, on which a repairing effect of the projections 538 and 548 is high, until the lamp voltage Vp falls to be lower than the lower threshold voltage. Therefore, the projections 538 and 548 are sufficiently repaired under the power supply condition on the high voltage side. Time during which the discharge lamp 500 can be driven under the power supply condition on the low voltage side is longer. In general, in the driving under the power supply condition on the high voltage side, the effect of repairing the electrodes is large. However, when long time driving is continued, it is likely that a harmful effect such as blackening occurs. Therefore, the hysteresis characteristic with respect to the lamp voltage Vp is given to the power supply condition and the driving time under the power supply condition on the low voltage side is set longer.

This makes it possible to suppress the deterioration of the discharge lamp 500 without causing the harmful effect such as blackening.

B. Second Embodiment (A Hysteresis Width is Changed According to a Lamp Voltage)

Figures 10, 11, 12:
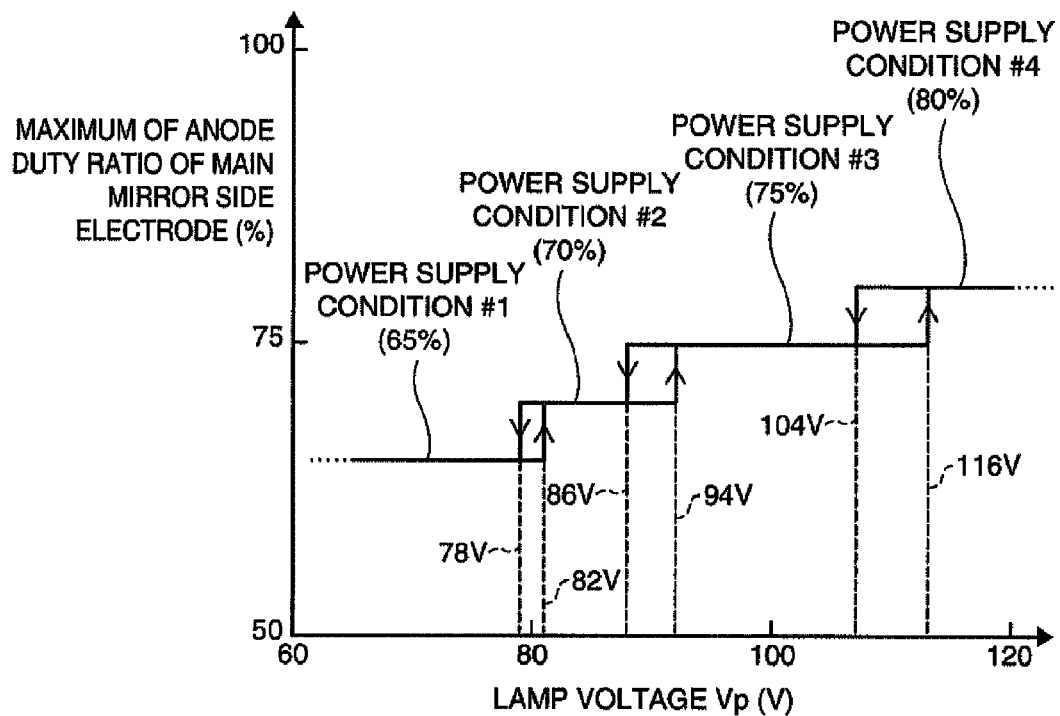
FIG. 10 is a table of contents of a power-supply-condition setting table according to a second embodiment of the present invention.
FIG. 11 is a diagram for explaining a state in which power supply conditions are set according to a lamp voltage with reference to the power-supply-condition setting table shown in FIG. 10.
FIG. 12 is a table of contents of a power-supply-condition setting table according to a third embodiment of the present invention.

FIG. 10 is a table representing contents of the power-supply-condition setting table 622 according to a second embodiment of the present invention. The second embodiment is different from the first embodiment in the contents of the power-supply-condition setting table 622. Otherwise, the second embodiment is the same as the first embodiment.

As shown in FIG. 10, in the power-supply-condition setting table 622 according to the second embodiment, lower and upper thresholds of a lamp voltage (a lower threshold voltage and an upper threshold voltage) and a modulation range of the anode duty ratio Dam of the main mirror side electrode 532 as a power supply condition are stored in association with each of plural power supply conditions. The power-supply-condition setting table 622 according to the second embodiment is different from the power-supply-condition setting table 622 according to the first embodiment shown in FIG. 7 in the lower threshold voltage and the upper threshold voltage corresponding to the second to fourth power supply conditions (#2 to #4). Otherwise, the power-supply-condition setting table 622 according to the second embodiment is the same as the power-supply-condition setting table 622 according to the first embodiment. As shown in FIG. 10, in the power-supply-condition setting table 622 according to the second embodiment, a difference between the upper threshold voltage and the lower threshold voltage (hysteresis width) used for switching of two power supply conditions increases as the lamp voltage rises.

FIG. 11 is a diagram for explaining a state in which power supply conditions are set according to a lamp voltage with reference to the power-supply-condition setting table 622 shown in FIG. 10. In a graph shown in FIG. 11, the abscissa represents the lamp voltage Vp and the ordinate represents the maximum of the anode duty ratio Dam of the main mirror side electrode 532.

As explained above, in the second embodiment, the hysteresis width between the two power supply conditions is larger as a power supply condition is further on the high voltage side. In this way, in the second embodiment, when the discharge lamp 500 is driven under the power supply conditions (#3 and #4) corresponding to a state of the high lamp voltage Vp, a lamp voltage at which the power supply condition is switched to the low voltage side is set further on the low voltage side. Therefore, in the state of the high lamp voltage Vp, projections are more sufficiently repaired according to the driving under the power supply condition on the high voltage side than that in the case of small hysteresis width. In general, the state of the high lamp voltage Vp is a state in which the use time of the discharge lamp 500 is long and it is more difficult to melt the tips of the projections than at the start of use of the discharge lamp 500. Therefore, as in the second embodiment, since the hysteresis width is increased as the lamp voltage Vp rises, even when it is difficult to melt the tips of the projections, it is possible to surely repair the projections and time during which the discharge lamp 500 can be driven under the power supply condition on the low voltage side used after the repairing can be set long. When the lamp voltage Vp is low, switching to the power supply condition on the low voltage side is more quickly performed. Therefore, it is possible to suppress the deterioration of the discharge lamp 500 due to the driving under the power supply condition on the high voltage side.

In the second embodiment, the upper threshold voltage and the lower threshold voltage are set to different values for all boundaries of the power supply conditions. However, the upper threshold voltage and the lower threshold voltage may be set to different values only for a part of the boundaries of the power supply conditions. In this case, the upper threshold voltage and the lower threshold voltage may be set to the same value for a boundary in a state of a low lamp voltage (e.g., a boundary of the first and second power supply conditions) not to give a hysteresis characteristic to switching of the power supply conditions.

Depending on a power supply condition to be switched, hysteresis width in the state of the low lamp voltage Vp may be set larger than hysteresis width in the state of the high lamp voltage Vp. For example, hysteresis width of switching of the first power supply condition and the second power supply condition may be set larger than hysteresis width of switching of the second power supply condition and the third power supply condition. Depending on a state of electrode of a discharge lamp, in some cases, an inter-electrode voltage falls to be lower than a rated value thereof. In such a case, the first power supply condition is set to facilitate a rise of the inter-electrode voltage. Therefore, when driving time under the first power supply condition is long, it is likely that the deterioration of the discharge lamp worsens. With this configuration, since the hysteresis width of switching of the power supply condition in a state of the low inter-electrode voltage is set large, the switching from the second power supply condition to the first power supply condition is more suppressed. The deterioration of the discharge lamp can be suppressed.

C. Third Embodiment (A Driving Frequency is Switched)

FIG. 12 is a table of contents of the power-supply-condition setting table 622 according to a third embodiment of the present invention. The third embodiment is different from the first embodiment in that contents of the power-supply-condition setting table 622 are different and different power supply conditions are used for the driving frequency fd as plural power supply conditions. Otherwise, the third embodiment is the same as the first embodiment.

As shown in FIG. 12, in the power-supply-condition setting table 622 according to the third embodiment, the lower and upper thresholds of a lamp voltage (the lower threshold voltage and the upper threshold voltage) and the driving frequency fd as a power supply condition are stored in association with each of plural power supply conditions. In the power-supply-condition setting table 622 according to the third embodiment, like the power-supply-condition setting table 622 according to the first embodiment shown in FIG. 7, hysteresis widths in all boundaries of the power supply conditions are set to the same value (4 V).

In the third embodiment, as shown in FIG. 12, the driving frequency fd is set to be higher as a lamp voltage rises. Therefore, when the power supply condition is switched from the low voltage side to the high voltage side, the driving frequency fd is higher than that before the switching. When the power supply condition is switched from the high voltage side to the low voltage side, the driving frequency fd is lower than that before the switching. Such a change of the driving frequency fd is performed when the power-supply-state control unit 612 (FIG. 3) instructs the lighting circuit 220 to change the switching period Tp (FIG. 5B). In the third embodiment, the anode duty ratio Dam of the main mirror side electrode 532 is set to 55% and the anode duty ratio Das of the sub-mirror side electrode 542 is set to 45%. However, the anode duty ratios Dam and Das do not always have to be fixed. As shown in FIG. 4 and FIGS. 5A and 5B, the anode duty ratios Dam and Das may be modulated at a predetermined modulation period.

In general, when the driving frequency fd of the discharge lamp 500 is set high, the projections 538 and 548 (FIGS. 9A and 9B) extend to the electrodes 532 and 542 opposed thereto, respectively. Therefore, when the lamp voltage Vp rises, the extension of the projections 538 and 548 are facilitated by setting the driving frequency fd high. When the projections 538 and 548 extend and the distance between the projections 532 and 542 decreases, the lamp voltage Vp falls. Since the projections 538 and 548 extend, an arc is stably formed between the tips of the projections. Therefore, it is possible to suppress occurrence of arc jump and the like by setting the driving frequency fd high.

Figure 13:
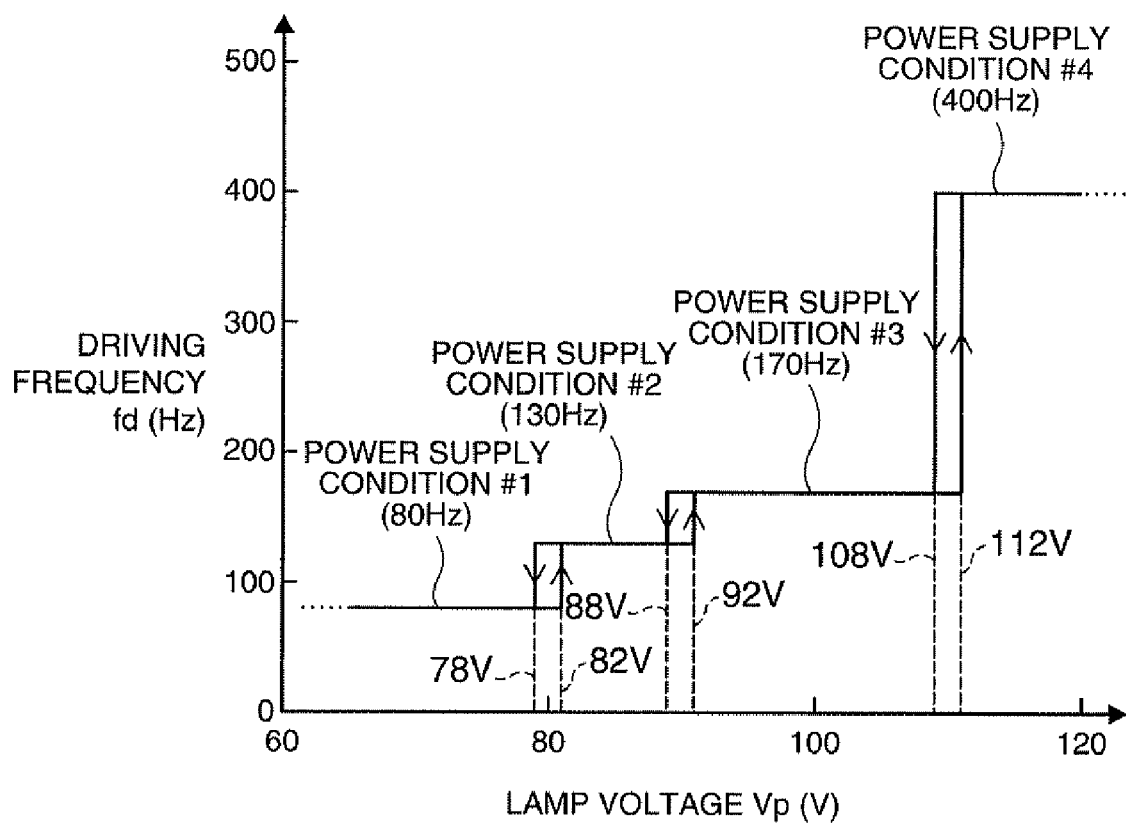
FIG. 13 is a diagram for explaining a state in which power supply conditions are set according to a lamp voltage with reference to the power supply condition setting table shown in FIG. 12.

FIG. 13 is a diagram for explaining a state in which power supply conditions are set according to a lamp voltage with reference to the power-supply-condition setting table 622 shown in FIG. 12, In a graph shown in FIG. 13, the abscissa represents the lamp voltage Vp and the ordinate represents the driving frequency fd.

As in the first embodiment, the driving frequency fd has a hysteresis characteristic with respect to the lamp voltage Vp. Therefore, the switching of a power supply condition from the high voltage side to the low voltage side is performed after the projections are sufficiently extended under the power supply condition on the high voltage side on which the driving frequency fd is higher. Therefore, as in the first embodiment, driving time under the power supply condition on the low voltage side can be set longer. It is possible to use the discharge lamp 500 for a longer period.

In the third embodiment, under the respective power supply conditions (#1 to #4), the discharge lamp 500 is driven at the single driving frequency fd. However, it is also possible to modulate the driving frequency fd at a predetermined period. In this case, the anode duty ratios Dam and Das of the electrodes 532 and 542 may be modulated according to the modulation of the driving frequency fd.

D. Modifications

The present invention is not limited to the embodiments and can be carried out in various forms without departing from the spirit of the present invention. For example, modifications explained below are possible.

D1. First Modification

In the embodiments, a rectangular pulse current is supplied to the discharge lamp 500. However, a waveform of an alternating pulse current supplied to the discharge lamp 500 does not always have to be rectangular. For example, the waveform of the alternating pulse current may be a waveform obtained by superimposing a lamp wave on a rectangular wave or may be a waveform obtained by further superimposing a rectangular pulse waveform on a rear end of the rectangular wave. However, the alternating pulse current is desirably the rectangular wave because fluctuation in a light amount radiated by the discharge lamp 500 can be suppressed.

D2. Second Modification

In the embodiments, the liquid crystal light valves 330R, 330G, and 330B are used as light modulating means in the projector 1000 (FIG. 1). However, other arbitrary modulating means such as a DMD (digital micro mirror device: a trademark of Texas Instruments Incorporated) can also be used as the light modulating means. The present invention can be applied to various image display apparatuses such as a liquid crystal display apparatus, exposing apparatuses, illuminating apparatuses, and the like as long as the apparatuses include discharge lamps as light sources.

D3. Third Modification

In the example explained in the second embodiment, the hysteresis width is changed according to the lamp voltage. However, the hysteresis width may be changed on the basis of other behaviors of the discharge lamp. For example, the hysteresis width may be changed according to fluctuation width of the lamp voltage. When the discharge lamp is used over a long period, in some cases, a shape of electrodes is roughened because of aged deterioration and fluctuation width of an inter-electrode voltage increases. When the shape of the electrodes is roughened in this way, it is difficult to melt the tips of the electrodes. Therefore, when the fluctuation width of the inter-electrode voltage is large, if the hysteresis width is set large, the shape of the electrode can be sufficiently recovered. When the fluctuation width of the inter-electrode voltage is small, it is relatively easy to recover the shape of the electrodes. Therefore, a harmful effect such as blackening of the electrodes can be suppressed by setting the hysteresis width small. As a whole, the deterioration of the discharge lamp can be suppressed. If it is more effective for the suppression of the deterioration of the discharge lamp to set the hysteresis width large when the fluctuation width of the inter-electrode voltage is small, the hysteresis width may be set large when the fluctuation width of the inter-electrode voltage is small.

When the behavior of the discharge lamp changes according to the use time of the discharge lamp, the hysteresis width may be changed on the basis of the use time of the discharge lamp. For example, when the use time of the discharge lamp reaches 10,000 hours, the hysteresis width may be increased to predetermined width. As explained above, when the discharge lamp is used over a long period, in some cases, because of aged deterioration, the shape of the electrodes is roughened and it is difficult to melt the tips of the electrodes and recover the shape of the electrodes. Therefore, if the hysteresis width is increased to the predetermined width according to the use time of the discharge lamp, the shape of the electrode can be sufficiently recovered.

The hysteresis width may be changed on the basis of electric power supplied to between the two electrodes of the discharge lamp. In some cases, plural driving modes of the discharge lamp are prepared according to supplied electric powers. For example, when three kinds of modes, i.e., a normal mode (200 W), a power saving mode (160 W), and a low noise mode (140 W) are prepared, the hysteresis width may be set larger as set power is lower. When the set power is low, in some cases, a tip shape of the electrodes tends to be roughened and it is difficult to recover the shape of the electrodes. Therefore, the shape of the electrodes can be sufficiently recovered by setting the hysteresis width larger as the set power is lower. When it is more effective for the suppression of the deterioration of the discharge lamp to set the hysteresis width larger as the set power is higher, the hysteresis width may be set larger as the set power is higher.

The entire disclosure of Japanese Patent Application No. 2008-204633, filed Aug. 7, 2008 and Japanese Patent Application No. 2009-162574, filed Jul. 9, 2009 are expressly incorporated by reference herein.

What is claimed is:

1. A driving device for a discharge lamp comprising:
a discharge-lamp lighting unit that supplies an alternating current to the discharge lamp to thereby supply electric power to between two electrodes of the discharge lamp and light the discharge lamp;
an inter-electrode-voltage detecting unit that detects an inter-electrode voltage applied when predetermined electric power is supplied to between the two electrodes; and
a power-supply-condition switching unit that switches, on the basis of the detected inter-electrode voltage, the power supply by the discharge-lamp lighting unit between a first power supply condition and a second power supply condition different from the first power supply condition with a predetermined hysteresis given to the switching of the power supply conditions, wherein
the power supply conditions are switched by changing at least one of a frequency of the alternating current, a duty ratio of the alternating current, a modulation pattern of the frequency, and a modulation pattern of the duty ratio.

2. The driving device for a discharge lamp according to claim 1, wherein
the power-supply-condition switching unit changes the width of the hysteresis according to a predetermined parameter based on electric behavior of the discharge lamp.

3. The driving device for a discharge lamp according to claim 2, wherein the parameter based on the electric behavior of the discharge lamp is fluctuation width of the inter-electrode voltage detected by the inter-electrode-voltage detecting unit.

4. The driving device for a discharge lamp according to claim 3, wherein the power-supply-condition switching unit sets the hysteresis width larger as the fluctuation width of the inter-electrode voltage is larger.

5. The driving device for a discharge lamp according to claim 2, wherein the parameter based on the electric behavior of the discharge lamp is electric power supplied to between the two electrodes of the discharge lamp by the discharge-lamp lighting unit.

6. The driving device for a discharge lamp according to claim 5, wherein the power-supply-condition switching unit sets the hysteresis width larger as the electric power supplied to between the two electrodes of the discharge lamp is smaller.

7. The driving device for a discharge lamp according to claim 1, wherein the power-supply-condition switching unit switches, on the basis of the detected inter-electrode voltage, the power supply by the discharge-lamp lighting unit between the second power supply condition and a third power supply condition different from the first power supply condition with the predetermined hysteresis given to the switching of the power supply.

8. The driving device for a discharge lamp according to claim 7, wherein
the power supply conditions are the first power supply condition, the second power supply condition, and the third power supply condition in order of smallness of the detected inter-electrode voltage, and
hysteresis width of switching between the second power supply condition and the third power supply condition is larger than hysteresis width of switching between the first power supply condition and the second power supply condition.

9. The driving device for a discharge lamp according to claim 1, wherein the power-supply-condition switching unit switches a power supply condition for the electric power supplied to between the two electrodes from the first power supply condition to the second power supply condition when the inter-electrode voltage rises and reaches a first upper limit voltage under the first power supply condition and switches the power supply condition from the second power supply condition to the first power supply condition when the inter-electrode voltage falls and reaches a second lower limit voltage lower than the first upper limit voltage under the second power supply condition.

10. The driving device for a discharge lamp according to claim 7, wherein the power-supply-condition switching unit switches a power supply condition for the electric power supplied to between the two electrodes from the second power supply condition to the third power supply condition when the inter-electrode voltage rises and reaches a second upper limit voltage under the second power supply condition and switches the power supply condition from the third power supply condition to the second power supply condition when the inter-electrode voltage falls and reaches a third lower limit voltage lower than the second upper limit voltage under the third power supply condition.

11. A light source device comprising:
a discharge lamp;
a discharge-lamp lighting unit that supplies an alternating current to the discharge lamp to thereby supply electric power to between two electrodes of the discharge lamp and light the discharge lamp;
an inter-electrode-voltage detecting unit that detects an inter-electrode voltage applied when predetermined electric power is supplied to between the two electrodes; and
a power-supply-condition switching unit that switches, on the basis of the detected inter-electrode voltage, the power supply by the discharge-lamp lighting unit between a first power supply condition and a second power supply condition different from the first power supply condition with a predetermined hysteresis given to the switching of the power supply conditions, wherein the power supply conditions are switched by changing at least one of a frequency of the alternating current, a duty ratio of the alternating current, a modulation pattern of the frequency, and a modulation pattern of the duty ratio.

12. The light source device according to claim 11, wherein the power-supply-condition switching unit changes the width of the hysteresis according to a predetermined parameter based on electric behavior of the discharge lamp.

13. The light source device according to claim 11, wherein the power-supply-condition switching unit switches, on the basis of the detected inter-electrode voltage, the power supply by the discharge-lamp lighting unit between the second power supply condition and a third power supply condition different from the first power supply condition with the predetermined hysteresis given to the switching of the power supply.

14. The light source device according to claim 11, wherein the power-supply-condition switching unit switches a power supply condition for the electric power supplied to between the two electrodes from the first power supply condition to the second power supply condition when the inter-electrode voltage rises and reaches a first upper limit voltage under the first power supply condition and switches the power supply condition from the second power supply condition to the first power supply condition when the inter-electrode voltage falls and reaches a second lower limit voltage lower than the first upper limit voltage under the second power supply condition.

15. An image display apparatus comprising:
a discharge lamp as a light source for image display;
a discharge-lamp lighting unit that supplies an alternating current to the discharge lamp to thereby supply electric power to between two electrodes of the discharge lamp and light the discharge lamp;
an inter-electrode-voltage detecting unit that detects an inter-electrode voltage applied when predetermined electric power is supplied to between the two electrodes; and
a power-supply-condition switching unit that switches, on the basis of the detected inter-electrode voltage, the power supply by the discharge-lamp lighting unit between a first power supply condition and a second power supply condition different from the first power supply condition with a predetermined hysteresis given to the switching of the power supply conditions, wherein
the power supply conditions are switched by changing at least one of a frequency of the alternating current, a duty ratio of the alternating current, a modulation pattern of the frequency, and a modulation pattern of the duty ratio.

16. The image display apparatus according to claim 15, wherein
the power-supply-condition switching unit changes the width of the hysteresis according to a predetermined parameter based on electric behavior of the discharge lamp.

17. The image display apparatus according to claim 15, wherein the power-supply-condition switching unit switches, on the basis of the detected inter-electrode voltage, the power supply by the discharge-lamp lighting unit between the second power supply condition and a third power supply condition different from the first power supply condition with the predetermined hysteresis given to the switching of the power supply.

18. The image display apparatus according to claim 15, wherein the power-supply-condition switching unit switches a power supply condition for the electric power supplied to between the two electrodes from the first power supply condition to the second power supply condition when the inter-electrode voltage rises and reaches a first upper limit voltage under the first power supply condition and switches the power supply condition from the second power supply condition to the first power supply condition when the inter-electrode voltage falls and reaches a second lower limit voltage lower than the first upper limit voltage under the second power supply condition.

19. A driving method for a discharge lamp for supplying an alternating current to the discharge lamp to thereby supply electric power to between two electrodes of the discharge lamp and light the discharge lamp, the driving method comprising the steps of:
detecting an inter-electrode voltage applied when predetermined electric power is supplied to between the two electrodes; and
switching, on the basis of the detected inter-electrode voltage, the power supply between a first power supply condition and a second power supply condition different from the first power supply condition with a predetermined hysteresis given to the switching of the power supply conditions, wherein
the power supply conditions are switched by changing at least one of a frequency of the alternating current, a duty ratio of the alternating current, a modulation pattern of the frequency, and a modulation pattern of the duty ratio.

* * * * *